Oct. 28, 1969 R. A. HEINZEN ET AL 3,475,630

SYNCHRONOUS MOTOR WITH PERMANENT MAGNET ROTOR

Filed July 19, 1967

INVENTORS
ROBERT A. HEINZEN
EDWIN R. MORLEY

BY

AGENT

United States Patent Office 3,475,630

Patented Oct. 28, 1969

1

3,475,630

SYNCHRONOUS MOTOR WITH PERMANENT MAGNET ROTOR

Robert Arthur Heinzen, Manitowoc, and Edwin Richard Morley, Two Rivers, Wis., assignors to American Machine & Foundry Company, a corporation of New Jersey Filed July 19, 1967, Ser. No. 654,426

Int. Cl. H02k 1/08

U.S. Cl. 310—43 14 Claims

ABSTRACT OF THE DISCLOSURE

A permanent magnet synchronous motor having a cup shape pole piece providing a disc portion at one end of the motor, and an annular series of pole members extending from the periphery of the disc portion to the other end of the motor; an annular coil disposed in the pole piece adjacent the disc portion; a permanent magnet rotor disposed within the series of pole members at the other end of the motor and having a peripheral flange extending toward the coil; a core extending through the coil which at one end engages the disc portion and at the other end has an annular flange disposed between the rotor and coil, and encircled by the rotor flange; the pole members each having a notch therein opposite the rotor flange and on the same side as the notches in the other pole members; the pole members being embedded in an annular mass to provide a motor housing closed at one end of the motor; and a cover at the other end of the motor releasably connected to the motor housing.

This invention relates to synchronous motors and more particularly to such motors embodying a single pole piece with a permanent magnet rotor.

This type of motor is shown, described and claimed in U.S. Patent 3,164,734, granted to R. A. Heinzen on Jan. 5, 1965, and assigned to the same assignee as is the present application.

An object of the present invention is to provide a synchronous motor, with a single pole piece and a permanent magnet rotor, which is smaller in size and has increased efficiency than heretofore found in motors of this type.

Another object of the present invention is to provide the foregoing motor having a coil, a core member and its rotor all disposed within its single pole piece.

And another object of the present invention is to provide the foregoing motor having pole members notched to prevent magnetic lockup when the motor is not energized which provides for positive starting when the motor coil is energized.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

Figure 1:
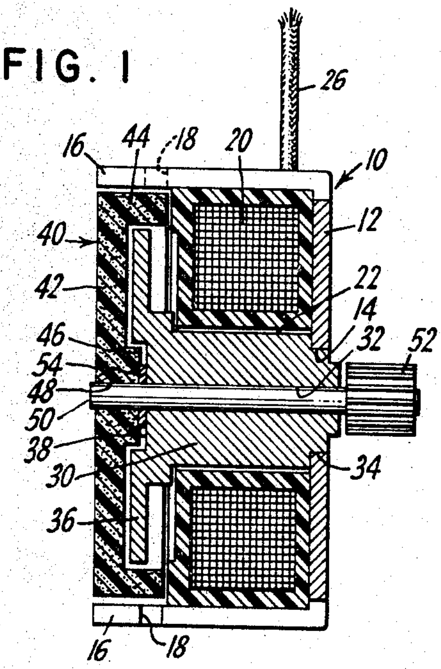
Figure 2:
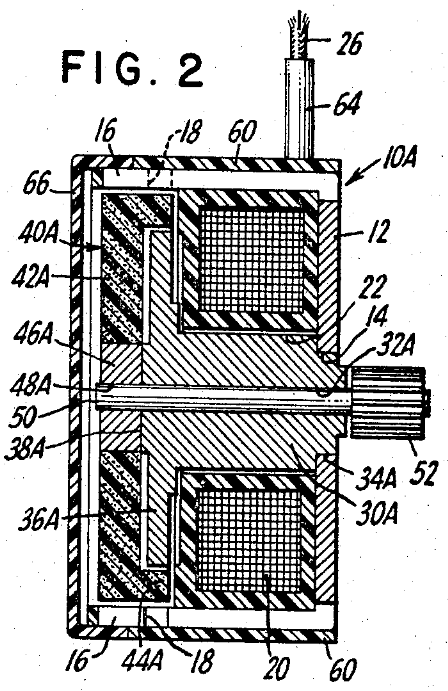
Figure 5:
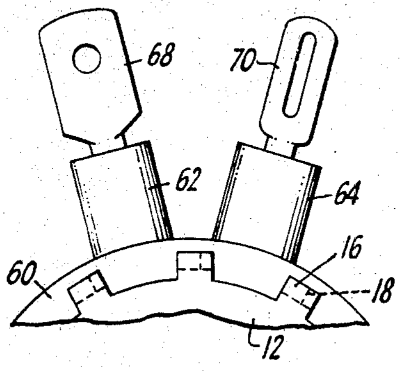
Figure 3:
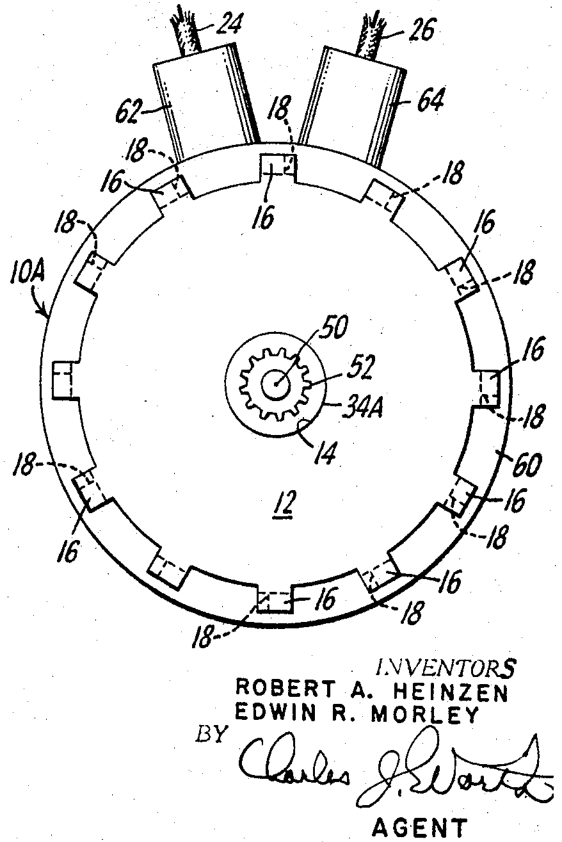
Figure 4:
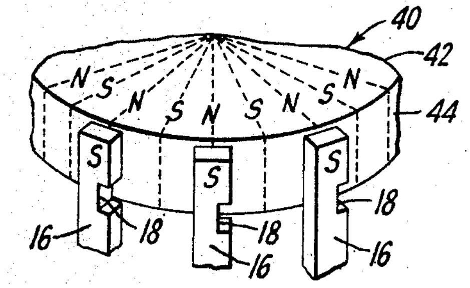

FIGURES 1 and 2 are sectional views of two, motors similar to each other, in accordance with the present invention, FIGURE 3 is an elevational view of the motor of FIGURE 2 as viewed at its output end, FIGURE 4 is a fragmentary perspective view a portion of the rotor and the adjacent ends of several stator pole portions of the motor of FIGURE 1, and FIGURE 5 is a fragmentary elevational view similar to a part of FIGURE 3 illustrating embodiment of two forms of terminals in place of conventional coil leads.

2

Referring now to the drawings and particularly to FIGURE 1, a motor made in accordance with the present invention is provided with a stator 10 and a permanent magnet rotor 40. The stator 10 includes a single cup shaped pole piece 12 of magnetic material, a coil 20 and a core member 30 which is also of a magnetic material.

Pole piece 12 is a circular disc, defining one end of the motor, having a central opening 14 therethrough and a plurality of salient pole members 16 which extend from periphery thereof and terminate in free ends which are substantially coplanar with the outer surface of rotor 40. Pole members 16 are substantially perpendicular to the disc portion of pole piece 12, and are disposed in a circular series each equally spaced angularly from the adjacent members, as shown in FIGURES 3 and 5.

The annular field coil 20 is disposed adjacent the disc portion of pole piece 12 and is encircled by the members 16. Coil 20 provides a central opening 22 therethrough and has a pair of leads 24 and 26 each passing between two of the members 16 for connection to an A.C. source (not shown).

The core piece or member 30 extends through opening 22 of coil 20 and has an axial through bore 32 for a rotor shaft 50. On end of core 30 has a reduced portion 34 which is disposed in and engages opening 14 while an annular flange 36 is provided at the other end thereof. Flange 36 is of greater diameter than the opening 22, extends across and is spaced from the end of coil 20 opposite from the disc portion of pole piece 12, and is of a smaller diameter than the coil. Thus, the periphery of flange 36 and the ends of the pole members 16, which extend beyond the coil 20, define an annular slot therebetween.

The permanent magnet rotor 40 is a circular cup shaped member providing a disc or body portion 42 with an annular peripheral flange 44 which extends toward coil 20 into the formed annular slot between pole members 16 and flange 36. Rotor 40 may be made of any suitable material such as a substantially rigid plastic or ceramic based ferrite, and has a central opening 48 for mounting on one end of the shaft 50 which extends through the axial bore 32 and has a gear 52 fixed to its other end. A central hub portion 46 may be provided to strengthen rotor 40, and the flanged end of core 30 may have a central recess 38 to accommodate hub 46. A washer 54 may be provided on shaft 50 between the face surfaces of hub 46 and recess 38.

The periphery of rotor 40 is permanently magnetized to provide a series of pole areas each being of a polarity opposite to the polarity of each adjacent pole area as indicated in FIGURE 5. In quiescence, rotor 40 will be positioned with adjacent north and south pole areas straddling the pole portions 16. As should be understood, pole piece 12 with its salient pole members 16, core 30 with its flange 36 and the rotor 40 with its flange 44 provide a flux path when coil 20 is energized. Flux across the formed annular gap between flange 36 and salient pole portions 16 is at substantially its maximum intensity at flange 44 and weakens or reduces progressively toward the outer surface at the periphery of the rotor body portion 42.

To prevent magnetic lockup or for positive starting of rotor 40 when coil 20 is energized each pole portion 16 is provided on one side with a notch 18; the notched sides of the pole portions 16 all being the same. For minimal magnetic imbalance when coil 20 is de-energized, notches 18 are kept as small as practicable. However, for this and to provide such positive starting when coil 20 is energized the notches 18 are spaced from the free ends of salient pole portions 16 and disposed adjacent rotor flange 44 in the area of maximum flux intensity. Thus, when the coil 20 is energized, magnetic forces acting on rotor 40 are off center from the various rotor pole areas because of notches 18.

In accordance with the present invention, the novel motor may be provided with a housing as shown in FIGURES 2 and 3 which also illustrate additional constructional modifications as will hereinafter be discussed. The motor of FIGURES 2 and 3 is provided with a stator 10A and a rotor 40A corresponding to stator 10 and rotor 40, respectively, of FIGURE 1.

Stator 10A includes the pole piece 12, coil 20 and a modified core piece or member 30A. Core piece 30A has an axial bore 32A, a reduced end portion 34A and a flange 36A corresponding to bore 32, end portion 34 and flange 36, respectively, of core 30. However, instead of recess 38, core 30A is provided with a central boss or bearing surface portion 38A which extends axially beyond flange 36A.

Pole piece 12 and coil 20, in this instance, are molded or encapsulated by any suitable means known in the art to provide a housing 60 which is open at the rotor end of the motor. The inner surfaces of the salient pole members 16 disposed beyond coil 20 are exposed or not covered by the encapsulating material. The outer surface of the disc portion of pole piece 12 may be similarly exposed.

Housing 60 preferably is formed with a pair of projections 62 and 64 which encapsulate the ends of leads 24 and 26, respectively, for support and to prevent inadvertent destruction of their connections to coil 20. Although projections 62 and 64 are shown as extending radially, they may be disposed parallel to one another or be formed together as a single enlargement.

Rotor 40A has a body portion 42A and an annular flange 44A corresponding to body portion 42 and flange 44 of rotor 40. In this instance, a central metallic insert 46A is provided, in place of the enlargement 46, with an axial opening 48A for the end of shaft 50. To enclose the rotor end of housing 60, a cover 66 is provided as shown in FIGURE 2.

The enclosed motor of FIGURES 2 and 3 may be provided with terminals, as shown in FIGURE 5, instead of leads 24 and 26. Two types of terminals 68 and 70 are shown as being supported by projections 62 and 64, respectively, merely to illustrate that various types of terminals may be provided. It should be understood, however, in actual practice both terminals of a motor would be of the same type.

Although several embodiments of the invention have been illustrated and described in detail, it is to be expressly understood that the invention is not limited thereto. Various changes may be made in the design and arrangement of the parts without departing from the spirit and scope of the invention as the same will now be understood by those skilled in the art.

We claim:

1. In a synchronous motor, a combination comprising:
- a pole piece of magnetic material providing a disc portion at one end of the motor and a plurality of salient pole members extending from the periphery of said disc portion to the other end of the motor;
- a coil disposed in said pole piece adjacent said disc portion;
- a rotor of permanent magnetic material encircled by said pole members at the other end of the motor;
- said rotor being axially spaced from said coil and having a peripheral flange extending toward said coil;
- a core member disposed in said pole piece and having an enlarged portion which extends between said rotor and coil within said peripheral rotor flange; and
- a plurality of said pole members each having a notch therein spaced from the end of said member and disposed adjacent to said peripheral rotor flange and on the same side as the other notched pole members.

2. The synchronous motor in accordance with claim 1 and further comprising:

- an annulus of plastic material encapsulating said pole members and with said pole piece providing a motor housing open at one end of the motor opposite from said disc portion.

3. The synchronous motor in accordance with claim 2, wherein:
- the surfaces adjacent to the periphery of said rotor of said pole members extending past said coil from said disc portion are exposed on the inside of said formed housing.

4. The synchronous motor in accordance with claim 3, wherein:
- said annulus of plastic material also encapsulates said coil.

5. The synchronous motor in accordance with claim 4, wherein:
- said coil having means connected thereto for connection to an electrical power source;
- said annulus of plastic material having a pair of protrusions extending therefrom each providing a passage from said coil and supporting one of said coil connecting means.

6. The synchronous motor in accordance with claim 5, wherein:
- said annulus of plastic material has a single enlargement providing said pair of protrusions.

7. The synchronous motor in accordance with claim 4, and further comprising:
- a cover detachably connected to said formed housing for closing the end of the motor opposite from said disc portion.

8. The synchronous motor in accordance with claim 1, wherein:
- said disc portion has a central opening therethrough;
- said core member extends axially through said coil, at one end having a reduced portion disposed in said central opening and engaging said disc portion to prevent relative movement between said pole piece and core member, and at its other end having a radially extending annular flange providing the enlarged core portion extending between said rotor and coil; and
- said rotor having a shaft connected at one end thereto which extends axially through said core member and is rotatably supported thereby.

9. The synchronous motor in accordance with claim 8, further comprising:
- an annulus of plastic material encapsulating said pole members and with said pole piece providing a motor housing open at one end of the motor opposite from said disc portion.

10. The synchronous motor in accordance with claim 9, wherein:
- the surfaces adjacent to the periphery of said rotor of said pole members extending past said coil from said disc portion are exposed on the inside of said formed housing.

11. The synchronous motor in accordance with claim 10, wherein:
- said annulus of plastic material also encapsulates said coil.

12. The synchronous motor in accordance with claim 11, wherein:
- said coil having means connected thereto for connection to an electrical power source;
- said annulus of plastic material having a pair of protrusions extending therefrom each providing a passage from said coil and supporting one of said coil connecting means.

13. The synchronous motor in accordance with claim 12, wherein:
- said annulus of plastic material has a single enlargement providing said pair of protrusions.

14. The synchronous motor in accordance with claim 11, and further comprising:

a cover detachably connected to said formed housing for closing the end of the motor opposite from said disc portion.

References Cited

UNITED STATES PATENTS

| | | | |
|---|---|---|---|
| 2,477,424 | 7/1949 | Schweitzer | 310—71 |
| 2,857,534 | 10/1958 | Beach | 310—268 |
| 2,861,203 | 11/1958 | Luneau | 310—43 |
| 3,121,813 | 2/1964 | Pratt | 310—43 |
| 3,149,256 | 9/1964 | Kohlhagen | 310—156 |
| 3,164,734 | 1/1965 | Heinzen | 310—156 |
| 3,231,770 | 1/1966 | Hyde | 310—156 |
| 3,293,463 | 12/1966 | Church | 310—71 |
| 3,322,987 | 5/1967 | Kohlhagen | 310—156 |
| 3,356,876 | 12/1967 | Scholten | 310—156 |
| 3,032,670 | 5/1962 | Fritz | 310—164 |

FOREIGN PATENTS

| | | |
|---|---|---|
| 1,193,587 | 5/1965 | Germany. |
| 1,201,905 | 9/1965 | Germany. |

ORIS L. RADER, Primary Examiner

LESTER L. HEWITT, Assistant Examiner

U.S. Cl. X.R.

310—71, 156, 164, 268